United States Patent
Kim et al.

(10) Patent No.: US 11,038,559 B2
(45) Date of Patent: Jun. 15, 2021

(54) METHOD AND APPARATUS FOR TRANSMITTING AND RECEIVING SIGNAL BASED ON BEAMFORMING IN COMMUNICATION SYSTEM

(71) Applicant: ELECTRONICS AND TELECOMMUNICATIONS RESEARCH INSTITUTE, Daejeon (KR)

(72) Inventors: Min Hyun Kim, Busan (KR); Tae Gyun Noh, Daejeon (KR); In Kyeong Choi, Daejeon (KR); Seung Eun Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/690,658

(22) Filed: Nov. 21, 2019

(65) Prior Publication Data

US 2020/0177242 A1 Jun. 4, 2020

(30) Foreign Application Priority Data

Nov. 29, 2018 (KR) .................. 10-2018-0151138
Nov. 18, 2019 (KR) .................. 10-2019-0148033

(51) Int. Cl.
*H04B 7/024* (2017.01)
*H04B 7/06* (2006.01)
*H04B 7/08* (2006.01)
*H04L 5/00* (2006.01)

(52) U.S. Cl.
CPC ........... *H04B 7/024* (2013.01); *H04B 7/0628* (2013.01); *H04B 7/088* (2013.01); *H04L 5/0007* (2013.01); *H04L 5/0035* (2013.01); *H04L 5/0048* (2013.01)

(58) Field of Classification Search
None
See application file for complete search history.

(56) References Cited

U.S. PATENT DOCUMENTS

| | | | |
|---|---|---|---|
| 9,397,744 B2 * | 7/2016 | Chang | H04B 7/15592 |
| 9,509,460 B2 * | 11/2016 | Kim | H04J 11/005 |
| 9,544,794 B2 * | 1/2017 | Kim | H04W 48/14 |
| 9,549,331 B2 * | 1/2017 | Kim | H04W 48/14 |

(Continued)

FOREIGN PATENT DOCUMENTS

WO 2018/147700 A1 8/2018
WO WO-2018147700 A1 * 8/2018 ........ H04W 72/0413

*Primary Examiner* — Berhanu Tadese
(74) *Attorney, Agent, or Firm* — Rabin & Berdo, P.C.

(57) ABSTRACT

Disclosed are methods for transmitting and receiving beamforming-based signals in a communication system. An operation method of a terminal may comprise transmitting capability information of the terminal to an AN; receiving first configuration information of a network cluster configured based on the capability information from the AN; transmitting an SRS in a beamforming scheme through resources indicated by the first configuration information; receiving second configuration information of a user cluster configured based on a measurement result of the SRS from the AN; and performing cooperative communication with ANs belonging to the user cluster, which are indicated by the second configuration information. Accordingly, the performance of the communication system can be improved.

13 Claims, 21 Drawing Sheets

(56) References Cited

U.S. PATENT DOCUMENTS

| | | | |
|---|---|---|---|
| 9,602,174 B2* | 3/2017 | Choi | H04B 7/0456 |
| 9,654,989 B2* | 5/2017 | Kim | H04W 24/02 |
| 9,800,304 B2* | 10/2017 | Kim | H04B 7/0469 |
| 9,807,632 B2* | 10/2017 | Kim | H04W 36/04 |
| 9,906,277 B2* | 2/2018 | Choi | H04B 7/024 |
| 9,936,405 B2* | 4/2018 | Seo | H04B 17/00 |
| 10,123,340 B2* | 11/2018 | Seo | H04W 72/085 |
| 10,411,778 B1* | 9/2019 | Ho | H04B 7/0632 |
| 10,506,596 B2* | 12/2019 | Yerramalli | H04W 16/14 |
| 10,595,283 B2* | 3/2020 | Kim | H04W 52/325 |
| 10,616,090 B2* | 4/2020 | Ross | H04L 43/16 |
| 10,660,063 B2* | 5/2020 | Park | H04W 68/02 |
| 10,833,736 B2* | 11/2020 | Hong | H04L 5/0035 |
| 2015/0016331 A1* | 1/2015 | Kim | H04J 11/005 370/312 |
| 2015/0016379 A1* | 1/2015 | Nam | H04B 7/0619 370/329 |
| 2015/0016419 A1* | 1/2015 | Kim | H04W 24/02 370/331 |
| 2015/0036524 A1* | 2/2015 | Kim | H04B 17/00 370/252 |
| 2015/0043367 A1* | 2/2015 | Kim | H04W 36/0083 370/252 |
| 2015/0055495 A1* | 2/2015 | Kim | H04W 36/04 370/252 |
| 2015/0103683 A1* | 4/2015 | Kim | H04W 24/02 370/252 |
| 2015/0103934 A1* | 4/2015 | Nam | H04B 7/0639 375/260 |
| 2015/0131577 A1* | 5/2015 | Kim | H04B 7/0619 370/329 |
| 2015/0146644 A1* | 5/2015 | Kim | H04L 5/0035 370/329 |
| 2015/0207601 A1* | 7/2015 | Kim | H04L 5/005 370/329 |
| 2015/0288428 A1* | 10/2015 | Choi | H04B 7/0408 370/329 |
| 2015/0304063 A1* | 10/2015 | Zhu | H04W 92/18 370/329 |
| 2016/0050575 A1* | 2/2016 | Seo | H04B 17/00 370/252 |
| 2016/0095131 A1* | 3/2016 | Seo | H04W 72/0413 370/329 |
| 2016/0344519 A1* | 11/2016 | Lin | H04L 5/005 |
| 2017/0195010 A1* | 7/2017 | Choi | H04B 7/024 |
| 2017/0208613 A1* | 7/2017 | Nam | H04B 7/0452 |
| 2017/0237535 A1* | 8/2017 | Park | H04W 72/0426 370/329 |
| 2018/0124790 A1* | 5/2018 | Yerramalli | H04W 16/14 |
| 2018/0270682 A1* | 9/2018 | Zacharias | H04W 74/0833 |
| 2018/0331935 A1* | 11/2018 | Ross | H04L 43/16 |
| 2018/0375557 A1* | 12/2018 | Noh | H04L 5/0053 |
| 2019/0081688 A1* | 3/2019 | Deenoo | H04B 7/088 |
| 2019/0159100 A1* | 5/2019 | Liou | H04W 72/042 |
| 2019/0181935 A1* | 6/2019 | Karjalainen | H01Q 3/24 |
| 2019/0253904 A1* | 8/2019 | Tsai | H04L 5/0094 |
| 2019/0260459 A1* | 8/2019 | Jeon | H04B 7/0617 |
| 2019/0268051 A1* | 8/2019 | Ho | H04B 7/0632 |
| 2020/0007282 A1* | 1/2020 | Yoon | H04W 36/0069 |
| 2020/0163079 A1* | 5/2020 | Choi | H04L 5/0048 |
| 2020/0169301 A1* | 5/2020 | Hong | H04B 7/0626 |
| 2020/0177242 A1* | 6/2020 | Kim | H04B 7/088 |

* cited by examiner

METHOD AND APPARATUS FOR TRANSMITTING AND RECEIVING SIGNAL BASED ON BEAMFORMING IN COMMUNICATION SYSTEM

CROSS-REFERENCE TO RELATED APPLICATIONS

This application claims priority to Korean Patent Applications No. 10-2018-0151138, filed on Nov. 29, 2018, and No. 10-2019-0148033, filed on Nov. 18, 2019 with the Korean Intellectual Property Office (KIPO), the entire contents of which are hereby incorporated by reference.

BACKGROUND

1. Technical Field

The present disclosure relates technologies for transmitting and receiving signals in a communication system, and more specifically, to technologies for transmitting and receiving signals by using hybrid beamforming.

2. Related Art

The communication system (hereinafter, a New Radio (NR) communication system) using a higher frequency band (e.g., a frequency band of 6 GHz or higher) than a frequency band (e.g., a frequency band of 6 GHz or lower) of the Long Term Evolution (LTE) (or, LTE-A) is being considered for processing of soaring wireless data. The NR communication system may support not only a frequency band below 6 GHz but also 6 GHz or higher frequency band, and may support various communication services and scenarios as compared to the LTE communication system. For example, usage scenarios of the NR communication system may include enhanced mobile broadband (eMBB), ultra-reliable low-latency communication (URLLC), massive machine type communication (mMTC), and the like.

The NR communication system may not have backward compatibility with the conventional communication system (e.g., LTE communication system). The NR communication system may use a wider frequency band than the conventional communication system to increase transmission capacity. In general, since the diffraction and reflection characteristics of the radio waves in a high frequency band are not good, the propagation loss (e.g., path loss and reflection loss) in a high frequency band may be larger than the propagation loss in a low frequency band.

Therefore, when the NR communication system operates in a high frequency band, the cell coverage of the NR communication system may be reduced. To solve this problem, a method of extending the cell coverage through beamforming (e.g., analog beamforming, digital beamforming, or hybrid beamforming) using a plurality of antennas in a high frequency band may be considered.

The analog beamforming may be implemented by steering a signal through a phase adjuster that is an analog device. Although the complexity of implementing the analog beamforming is not high, the analog beamforming may not realize high resolution. On the other hand, the digital beamforming may be implemented by steering a signal by freely adjusting the amplitude and phase of the signal through digital signal processing. The digital beamforming may implement high resolution, but cost and complexity may increase because an antenna-specific radio frequency (RF) chain is required. Therefore, the hybrid beamforming technique capable of acquiring the advantages of the analog beamforming technique and the digital beamforming technique may be considered.

Meanwhile, a large capacity mobile network (e.g., an ultra-dense network (UDN)) may be considered to accommodate the exploding mobile traffic. The UDN may include a large number of small cells, and the density of the small cells in the UDN may be high. Communications may be performed using the hybrid beamforming technique in the UDN, and there is a need for hybrid beamforming methods therefor.

SUMMARY

Accordingly, exemplary embodiments of the present disclosure provide a method and an apparatus for transmitting and receiving signals by using hybrid beamforming in a communication system.

According to an exemplary embodiment of the present disclosure, an operation method of a terminal in a communication system may comprise transmitting capability information of the terminal to an access node (AN); receiving first configuration information of a network cluster configured based on the capability information from the AN; transmitting a sounding reference signal (SRS) in a beamforming scheme through resources indicated by the first configuration information; receiving second configuration information of a user cluster configured based on a measurement result of the SRS from the AN; and performing cooperative communication with ANs belonging to the user cluster, which are indicated by the second configuration information.

The capability information may include information indicating a number of panels constituting an antenna of the terminal, information indicating a number of beams supported by the terminal, and information indicating a number of antenna ports supported by the terminal.

The capability information may be transmitted to the AN through a radio resource control (RRC) message, and the AN may be an AN to which the terminal is initially connected.

The receiving of the first configuration information may further comprise receiving, from the AN, an RRC message including configuration information of SRS resource sets; and receiving, from the AN, downlink control information (DCI) including information indicating an SRS resource set used for transmission of the SRS among the SRS resource sets.

The configuration information of the SRS resource sets may include an index of an SRS resource set, information indicating a number of SRS resources constituting an SRS resource set, information indicating a number of ports per SRS resource, and time domain behavior information.

The SRS resource set indicated by the DCI may be an SRS resource set used for beam management for each panel of the terminal.

The DCI may further include information indicating a panel of the terminal to which the SRS resource set indicated by the DCI is applied.

The second configuration information may be received from the AN through DCI, and the DCI may include a transmission configuration indication (TCI) field indicating information of a beam to be used for each panel of the terminal.

According to another exemplary embodiment of the present disclosure, an operation method of an access node (AN) in a communication system may comprise receiving capability information from a terminal; transmitting the capability information to a centralized processor (CP); receiving first configuration information of a network cluster configured based on the capability information from the CP; transmitting the first configuration information to the terminal; measuring a beam state based on a sounding reference signal (SRS) received from the terminal through resources indicated by the first configuration information; and transmitting beam measurement information to the CP.

The capability information may include information indicating a number of panels constituting an antenna of the terminal, information indicating a number of beams supported by the terminal, and information indicating a number of antenna ports supported by the terminal.

The transmitting the first configuration information to the terminal may further comprise transmitting, to the terminal, an RRC message including configuration information of SRS resource sets; and transmitting, to the terminal, downlink control information (DCI) including information indicating an SRS resource set used for transmission of the SRS among the SRS resource sets.

The configuration information of the SRS resource sets may include an index of an SRS resource set, information indicating a number of SRS resources constituting an SRS resource set, information indicating a number of ports per SRS resource, and time domain behavior information.

The SRS resource set indicated by the DCI may be an SRS resource set used for beam management for each panel of the terminal.

The DCI may further include information indicating a panel of the terminal to which the SRS resource set indicated by the DCI is applied.

The beam measurement information may include a reference signal received power (RSRP) for a beam, an identifier (ID) of an AN measuring the beam, and an ID of the beam.

The operation method may further comprise receiving second configuration information of a user cluster configured based on the beam measurement information from the CP; transmitting the second configuration information to the terminal; and providing a communication service to the terminal by performing cooperative communication with ANs belonging to the user cluster, which are indicated by the second configuration information.

According to another exemplary embodiment of the present disclosure, a terminal in a communication system may comprise a processor and a memory storing at least one instruction executable by the processor. The at least one instruction may cause the processor to transmit capability information of the terminal to an access node (AN); receive first configuration information of a network cluster configured based on the capability information from the AN; transmit a sounding reference signal (SRS) in a beamforming scheme through resources indicated by the first configuration information; receive second configuration information of a user cluster configured based on a measurement result of the SRS from the AN; and perform cooperative communication with ANs belonging to the user cluster, which are indicated by the second configuration information.

The capability information may include information indicating a number of panels constituting an antenna of the terminal, information indicating a number of beams supported by the terminal, and information indicating a number of antenna ports supported by the terminal.

When the first configuration information is received from the AN, the at least one instruction may further cause the processor to receive, from the AN, an RRC message including configuration information of SRS resource sets; and receive, from the AN, downlink control information (DCI) including information indicating an SRS resource set used for transmission of the SRS among the SRS resource sets.

The configuration information of the SRS resource sets may include an index of an SRS resource set, information indicating a number of SRS resources constituting an SRS resource set, information indicating a number of ports per SRS resource, and time domain behavior information.

According to the present disclosure, in the ultra-dense network (UDN), a network cluster may be configured based on capability information of the terminal, and in the network cluster, a user cluster may be configured based on measurement information of a beamformed sounding reference signal (SRS) from the terminal. The user cluster may be configured with a plurality of access nodes (AN), states of uplink channels between the plurality of ANs belonging to the user cluster and the terminal may be measured based on the beamformed SRS from the terminal, and states of downlink channels between the plurality of ANs belonging to the user cluster and the terminal may be measured based on beamformed channel state information-reference signals (CSI-RSs) from the plurality of ANs. The cooperative communication between the plurality of ANs belonging to the user cluster and the terminal may be performed based on the measurement information of the uplink/downlink channel states. Accordingly, signaling load for the cooperative communication can be reduced, and the performance of the communication system can be improved.

BRIEF DESCRIPTION OF DRAWINGS

Exemplary embodiments of the present disclosure will become more apparent by describing in detail embodiments of the present disclosure with reference to the accompanying drawings, in which.

Figure 1:
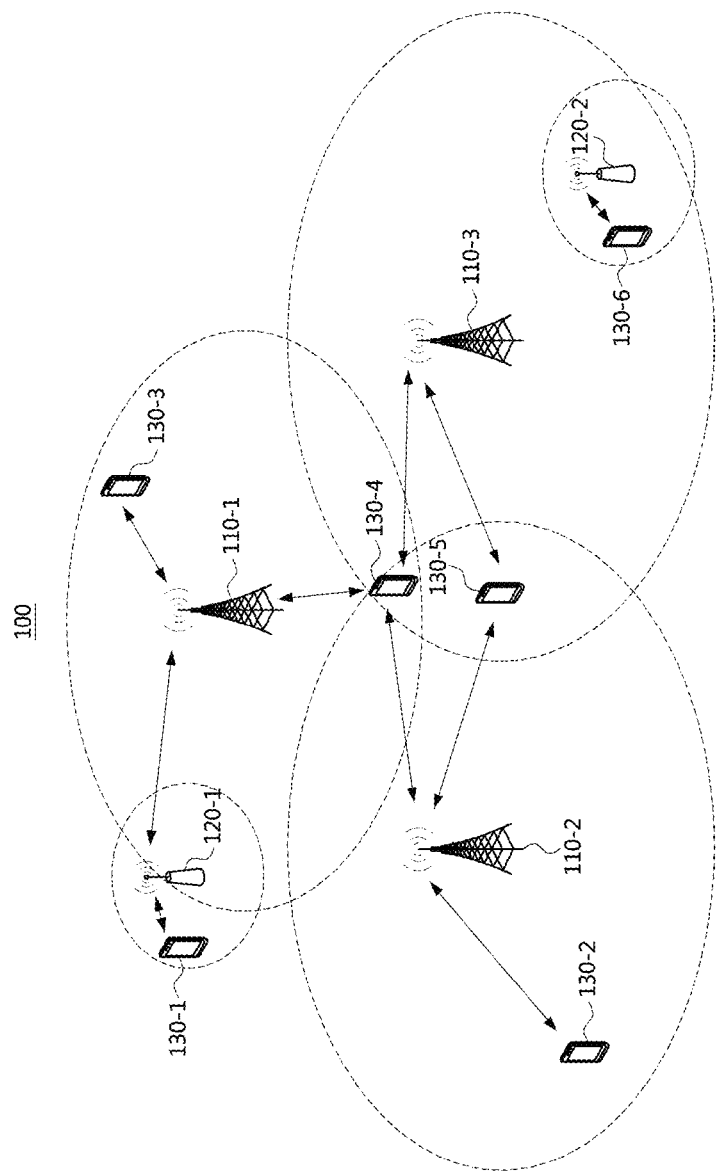
FIG. 1 is a conceptual diagram illustrating a first exemplary embodiment of a communication system.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system may be the 4G communication system (e.g., Long-Term Evolution (LTE) communication system or LTE-A communication system), the 5G communication system (e.g., New Radio (NR) communication system), or the like. The 4G communication system may support communication in a frequency band of 6 GHz or below, and the 5G communication system may support communication in a frequency band of 6 GHz or above as well as the frequency band of 6 GHz or below. The communication system to which the exemplary embodiments according to the present disclosure are applied is not limited to the contents described below, and the exemplary embodiments according to the present disclosure may be applied to various communication systems. Here, the communication system may be used in the same sense as a communication network. "LTE" may indicate "4G communication system", "LTE communication system" or "LTE-A communication system", and "NR" may indicate "5G communication system" or "NR communication system".

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may further comprise a core network (e.g., a serving gateway (S-GW), a packet data network (PDN) gateway (P-GW), and a mobility management entity (MME)). When the communication system 100 is a 5G communication system (e.g., New Radio (NR) system, the core network may include an access and mobility management function (AMF), a user plane function (UPF), a session management function (SMF), and the like.

The plurality of communication nodes 110 to 130 may support communication protocols defined in the $3^{rd}$ generation partnership project (3GPP) technical specifications (e.g., LTE communication protocol, LTE-A communication protocol, NR communication protocol, or the like). The plurality of communication nodes 110 to 130 may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
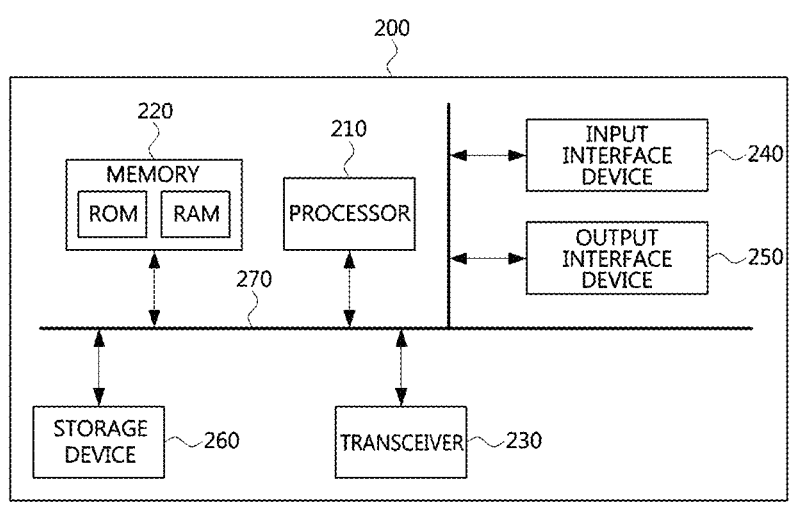
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), or the like.

Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, the communication system (e.g., NR communication system) may support one or more of an enhanced mobile broadband (eMBB) service, an ultra-reliable and low-latency communication (URLLC) service, and a massive machine type communication (mMTC) service. The communications may be performed to satisfy technical requirements of the services in the communication system.

A numerology applied to physical signals and channels in the communication system may vary. In the communication system to which a cyclic prefix (CP) based OFDM waveform technology is applied, the numerology may include a subcarrier spacing and a CP length (or CP type). Table 1 below may be a first exemplary embodiment of configuration of numerologies for the CP-based OFDM. The subcarrier spacings may have an exponential multiplication relationship of 2, and the CP length may be scaled at the same ratio as the OFDM symbol length. Depending on a frequency band in which the communication system operates, some of the numerologies of Table 1 may be supported. When the subcarrier spacing is 60 kHz, an extended CP may be additionally supported.

TABLE 1

| Subcarrier spacing | 15 kHz | 30 kHz | 60 kHz | 120 kHz | 240 kHz |
| --- | --- | --- | --- | --- | --- |
| OFDM symbol length [μs] | 66.7 | 33.3 | 16.7 | 8.3 | 4.2 |
| CP length [μs] | 4.76 | 2.38 | 1.19 | 0.60 | 0.30 |
| Number of OFDM symbols within 1 ms | 14 | 28 | 56 | 112 | 224 |

Hereinafter, methods for transmitting and receiving signals in a communication system will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

The following exemplary embodiments relate to a cooperative transmission method and a signaling method in a communication system using hybrid beamforming. The cooperative transmission method may include an uplink beam management method, a network-centric clustering method, a user-centric clustering method, a channel information acquisition method, a data transmission method, and the like. The following exemplary embodiments may be applied to an ultra-dense network (UDN) as well as the communication system (e.g., NR communication system) shown in FIG. 1. In addition, the following exemplary embodiments may be applied to other communication systems.

When the purpose or characteristics of the physical signal/channel are similar in communication systems (e.g., LTE communication system, NR communication system, UDN), the same name thereof may be used for convenience. For example, a signal used for acquiring downlink channel information may be referred to as a channel state information-reference signal (CSI-RS). The UDN to which the following exemplary embodiments are applied may be configured as follows.

Figure 3:
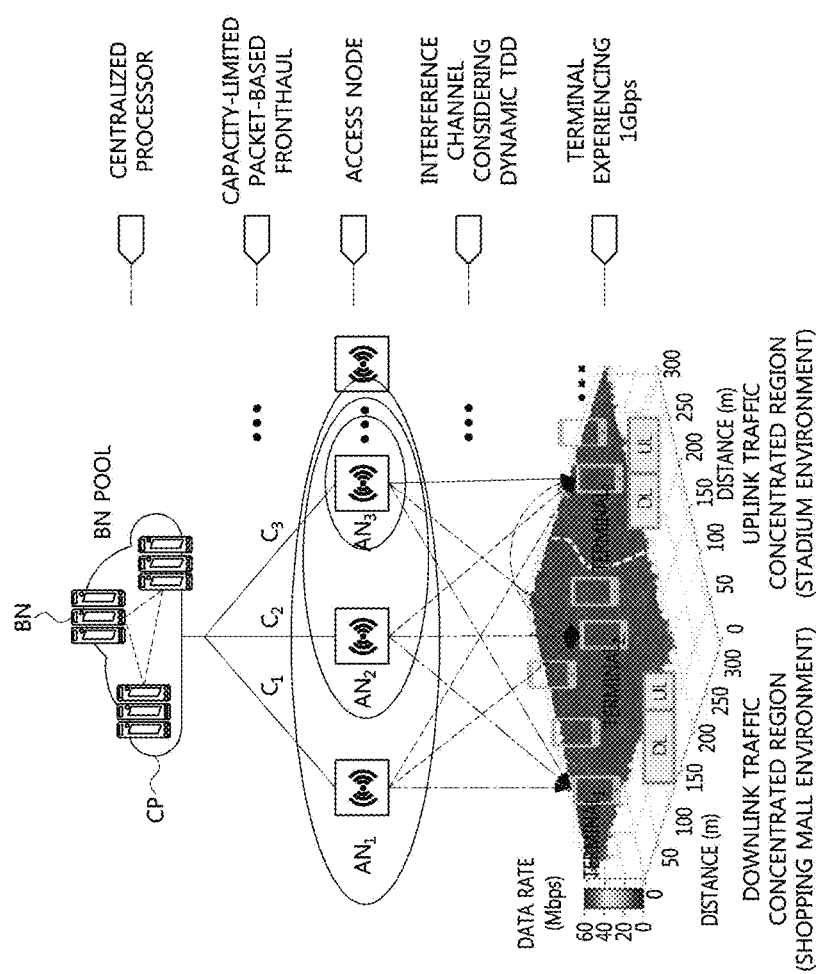
FIG. 3 is a conceptual diagram illustrating a first exemplary embodiment of a UDN.

FIG. 3 is a conceptual diagram illustrating a first exemplary embodiment of a UDN.

As shown in FIG. 3, a UDN may accommodate explodingly increasing mobile traffic, and for this purpose, the UDN may be configured with a plurality of densely populated cells (e.g., small cells). In order to efficiently operate the highly dense cells, a UDN having a cloud-radio access network (C-RAN) structure that can provide centralized signal processing and radio resource management through functional split and centralization of a base station may be considered.

The UDN may include a centralized processor (CP), at least one access node (AN), at least one terminal (i.e., a user equipment (UE)), and the like. The CP may be a base node (BN) pool composed of a plurality of BNs. In other words, the CP may have a structure in which BNs are centralized to form a pool at one site. The CP may have a general purpose processor with high computing power. The modem functions in the UDN may be split. For example, some functions of the conventional base station may be performed in the CP, and the remaining functions may be performed in the ANs. As a result, the centralized signal processing and resource management may be facilitated, inter-cell interferences in the UDN may be effectively controlled, and big data processing may be possible.

The CP may be connected to the AN via a fronthaul (e.g., a capacity-limited packet-based fronthaul). The capacity-limited packet-based fronthaul may be a fronthaul that improves the function of the existing capacity-limited orthogonal fronthaul, and may support packet-based statistical multiplexing. In addition, the capacity-limited packet-based fronthaul may perform a function of transferring of large-capacity traffic to the ANs distributed at high density in a cost and energy efficient manner.

The AN may support some of the modem functions to reduce the capacity burden on the fronthaul. The ANs distributed at high density may perform cooperative transmission (e.g., cooperative communication), and interference may be minimized through the cooperative transmission. There may be an interference channel in consideration of a dynamic time division duplex (TDD) in an access link between the AN and the terminal. The dynamic TDD operation may be supported to effectively accommodate spatial and temporal traffic fluctuations, and interference management techniques through the cooperative transmission may be applied to interference channels formed by transmission and reception between the high-density distributed ANs and the multiple terminals. The dynamic TDD operation may be performed assuming that uplink and downlink have channel reciprocity.

In the terminal supporting broadband communication, a communication speed may be 1 Gbps or more. The cooperative transmission through the multiple distributed ANs may provide a consistent user quality of experience (QoE) regardless of the location of the terminal.

The functions of one base station may be split and performed in the BN and AN, and a plurality of ANs distributed in close proximity to the terminal may be connected to the CP through the capacity-limited packet-based fronthaul. The fronthaul may support both ideal and non-ideal connections.

In the following, a cooperative transmission method and a signaling method for providing the consistent user QoE regardless of the location of the terminal in the UDN shown in FIG. 3 will be described. The cooperative transmission method will be described based on data transmission. The signaling method for an initial access procedure, a control channel transmission procedure, a mobility management procedure, and the like may be mentioned in the data transmission procedure. The terminal may operate in a radio resource control (RRC) connected state, which may mean that the initial access procedure thereof is completed. The terminal being provided with a communication service may be a terminal that has acquired synchronization and system information from the communication system. The cooperative transmission method after the initial access procedure may be performed as follows.

[Uplink Beam Management Procedure]

In a communication system supporting beamforming (e.g., hybrid beamforming), a beam management procedure may be preferentially performed for communication between the AN and the terminal. The communication system to which the exemplary embodiments below are applied may include the communication system (e.g., NR or LTE communication system) shown in FIG. 1 and the UDN shown in FIG. 3. The beam management procedure may include a downlink beam management procedure and an uplink beam management procedure.

In the downlink beam management procedure, the base station (e.g., eNB, gNB, AN) may configure a CSI-RS for beam management, and transmit the CSI-RS in a beamforming scheme using each of a plurality of beams. The terminal may receive the beamformed CSI-RS from the base station, measure a reference signal received power (RSRP) of the CSI-RS, and report information of a beam through which the CSI-RS is received with a high RSRP to the base station. The base station may select a transmission beam (e.g., transmission analog beam) to be used for beamforming based on the information received from the terminal, and inform the terminal of information indicating the selected transmission beam through one or more of an RRC message, downlink control information (DCI), and a medium access control (MAC) control element (CE).

In the uplink beam management procedure, a sounding reference signal (SRS) may be configured for beam management. The terminal may transmit the SRS in a beamforming scheme by using each of a plurality of beams. The base station may receive the beamformed SRS from the terminal, and may measure an RSRP of the SRS. The base station may determine a beam through which the SRS is received with a high RSRP as a transmission beam (e.g., transmission analog beam) to be used for beamforming, and inform the terminal of information indicating the determined transmission beam through one or more of an RRC message, DCI, and a MAC CE. The downlink beam management procedure in the UDN may be performed as follows.

Figure 4:
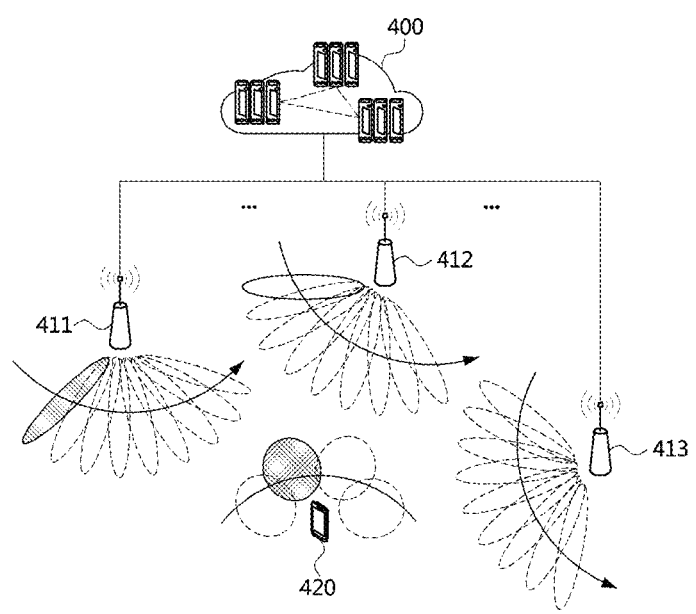
FIG. 4 is a conceptual diagram illustrating a first exemplary embodiment of a downlink beam management procedure in a UDN.

FIG. 4 is a conceptual diagram illustrating a first exemplary embodiment of a downlink beam management procedure in a UDN.

As shown in FIG. 4, a UDN may include a CP 400, an AN #1 411, an AN #2 412, an AN #3 413, a terminal 420, and the like. The CP 400 may comprise a plurality of BNs. Functions of a base station (e.g., eNB, gNB) may be distributed in the CP 400 and the ANs 411 to 413. The UDN shown in FIG. 4 may be configured identically or similarly to the UDN shown in FIG. 3.

The ANs 411 to 413 may sequentially transmit a CSI-RS. For example, the AN #1 411 may transmit a CSI-RS in a beamforming scheme using each of a plurality of beams, and then the AN #2 412 may transmit a CSI-RS in a beamforming scheme using each of a plurality of beams, and finally, the AN #3 413 may transmit a CSI-RS in a beamforming scheme using each of a plurality of beams. Here, analog beams may be used.

In this case, the terminal 420 may first measure an RSRP of each of the beamformed CSI-RSs from the AN #1 411, and then measure an RSRP of each of the beamformed CSI-RSs from the AN #2 412, and finally measure an RSRP of each of the beamformed CSI-RSs from the AN #3 413.

Resources used for the downlink beam management procedure may be calculated as follows. Here, it is assumed that the number of resources used in a quality measurement procedure for configuring one beam pair is one. The total number of beams managed by the CP 400 may be "number of ANs×number of panels per AN×number of beams per panel of each AN". The total number of beams managed by the terminal 420 may be "number of panels of a terminal×number of beams per panel of a terminal". Accordingly, the number of resources used for the downlink beam management procedure may be "number of ANs×number of panels per AN×number of beams per panel of each AN×number of panels of a terminal×number of beams per panel of a terminal". In particular, many ANs exist in the UDN, and the resources used for the downlink beam management procedure may increase in proportion to the number of ANs.

On the other hand, the uplink beam management procedure in the UDN may be performed as follows.

Figure 5:
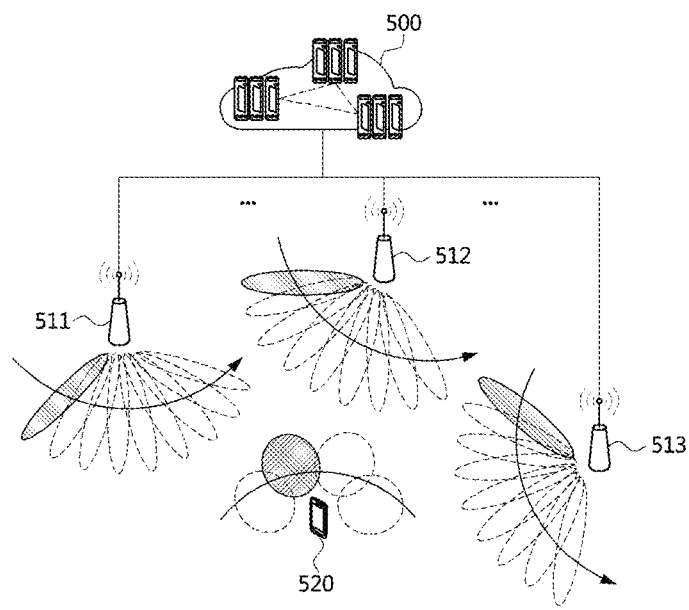
FIG. 5 is a conceptual diagram illustrating a first exemplary embodiment of an uplink beam management procedure in a UDN.

FIG. 5 is a conceptual diagram illustrating a first exemplary embodiment of an uplink beam management procedure in a UDN.

As shown in FIG. 5, a UDN may include a CP 500, an AN #1 511, an AN #2 512, an AN #3 513, a terminal 520, and the like. The CP 500 may comprise a plurality of BNs. Functions of a base station (e.g., eNB, gNB) may be distributed in the CP 500 and the ANs 511 to 513. The UDN shown in FIG. 5 may be configured identically or similarly to the UDN shown in FIG. 3.

In the uplink beam management procedure, the terminal 520 may transmit an SRS in a beamforming scheme by using each of a plurality of beams. The ANs 511 to 513 may operate independently and may receive the beamformed SRS from the terminal 520. Each of the ANs 511 to 513 may measure an RSRP of the received SRS, and determine a transmission beam based on the measured RSRP. The transmission beam determination procedure performed in the ANs 511 to 513 may be performed in parallel.

Since the number of terminals 520 in the uplink beam management procedure is smaller than the number of ANs 411 to 413 in the downlink beam management procedure, and the number of beams of the terminal 520 in the uplink beam management procedure is smaller than the number of beam of the ANs 411 to 413 in the downlink beam management procedure, the resources necessary for the uplink beam management procedure may be smaller than the resources required for the downlink beam management procedure. Therefore, to determine a beam pair in the UDN, it may be more efficient to perform the uplink beam management procedure than the downlink beam management procedure.

In the uplink beam management procedure, SRS requirements may be as follows.

Time Division Multiplexing (TDM) Support

When analog beams are used, the SRS resources allocated to the respective beams may be configured in a TDM scheme.

Multi-Port Support (Multi-Panel and Cross-Polarization)

The antenna of the terminal may include multiple panels and may support cross-polarization. Therefore, antenna design considering multi-port may be necessary.

Broadband Support

The millimeter wave communication system can support broadband, and in the millimeter wave communication system, the analog beams can be used in the entire band. Thus, signals (e.g., SRS) used in the millimeter wave communication system may be designed to support broadband.

Figure 6:
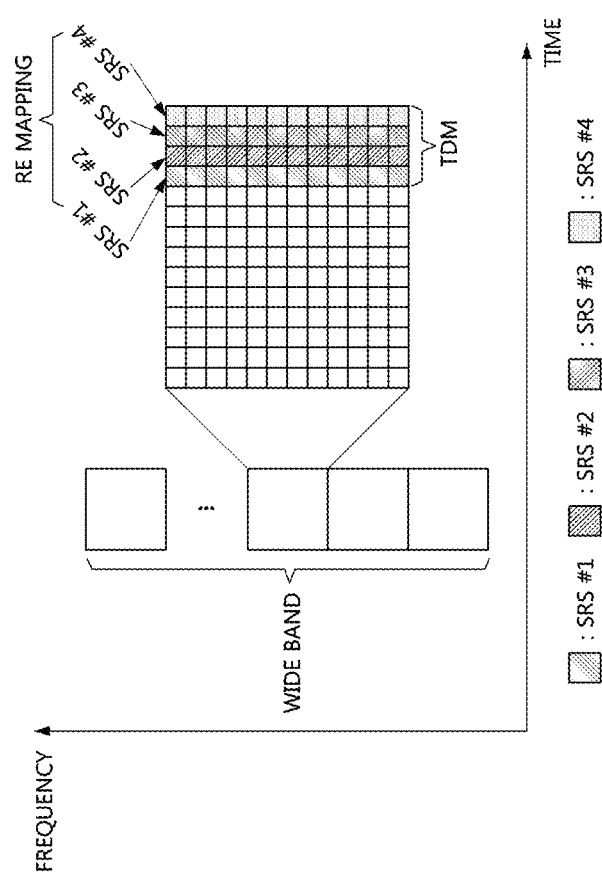
FIG. 6 is a conceptual diagram illustrating a first exemplary embodiment of an SRS structure in a UDN.

FIG. 6 is a conceptual diagram illustrating a first exemplary embodiment of an SRS structure in a UDN.

As shown in FIG. 6, SRSs may be mapped to CP-OFDM resources in a TDM scheme. Here, the antenna of the terminal may have a single panel. An SRS #1 may be resources to which an SRS transmitted through a first beam of the terminal is mapped, an SRS #2 may be resources to which an SRS transmitted through a second beam of the terminal is mapped, an SRS #3 may be resources to which an SRS transmitted through a third beam of the terminal is mapped, and an SRS #4 may be resources to which an SRS transmitted through a fourth beam of the terminal is mapped. Each of the first to fourth beams may be an analog beam. A sequence of the SRS may be a Zadoff-Chu sequence, and a different sequence may be allocated to each SRS resource.

The location of the SRS in the time domain may be freely configured in an uplink resource region. The SRS transmitted through one beam may be mapped to one OFDM symbol. However, since it is inefficient to use all frequency resources for SRS transmission in one OFDM symbol, the frequency resources in one OFDM symbol may be configured in a comb-N form. For example, the frequency resources in one OFDM symbol may be used for transmission of uplink signals/channels other than the SRS.

Figure 7:
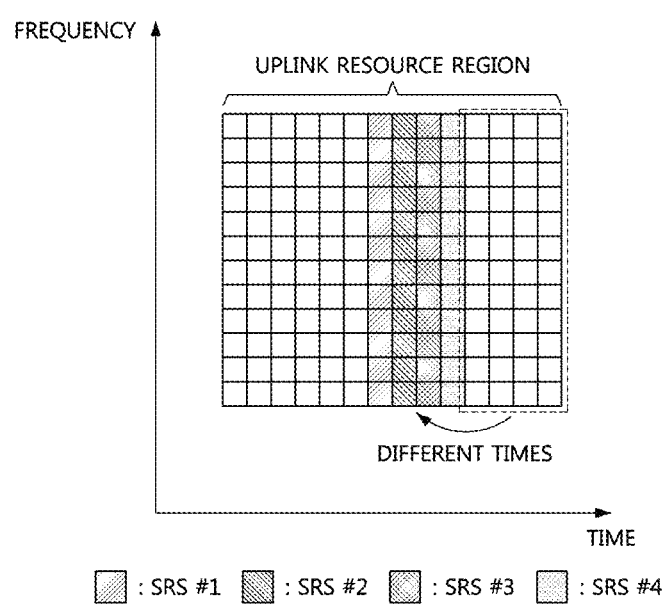
FIG. 7 is a conceptual diagram illustrating a second exemplary embodiment of an SRS structure in a UDN.
Figure 8:
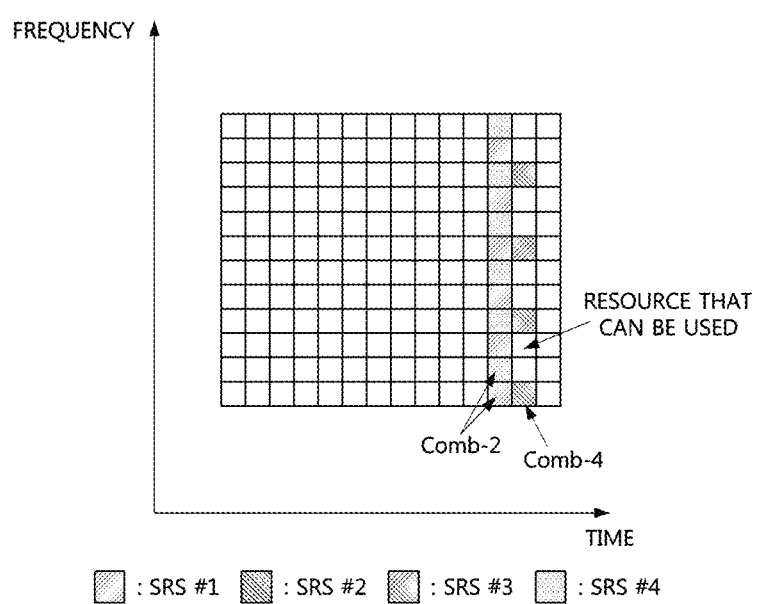
FIG. 8 is a conceptual diagram illustrating a third exemplary embodiment of an SRS structure in a UDN.

FIG. 7 is a conceptual diagram illustrating a second exemplary embodiment of an SRS structure in a UDN, and FIG. 8 is a conceptual diagram illustrating a third exemplary embodiment of an SRS structure in a UDN.

In the exemplary embodiment shown in FIG. 7, the SRSs may be freely configured within an uplink resource region. In the exemplary embodiment shown in FIG. 8, frequency resources in one OFDM symbol may be configured in a form of Comb-2 or Comb-4. When Comb-2 is used, the frequency resources in one OFDM symbol may be used for transmission of SRS #1 and SRS #4. When Comb-4 is used, the frequency resources in one OFDM symbol may be used for transmission of SRS #3 and other uplink signal and channel.

The structure of the antenna having multiple panels may be different from that of the antenna having a single panel, and configuration for the uplink beam management procedure may vary according to the antenna structure. To this end, the terminal may report its capability information (e.g., number of panels, number of beams, etc.) to the AN. The AN may receive the capability information from the terminal and may transfer the corresponding capability information to the CP. Configuration information for the uplink beam management procedure may be generated based on the capability information of the terminal.

When the terminal uses an antenna having multiple panels, the terminal may simultaneously transmit independent beams in one OFDM symbol. In this case, orthogonal resources may be allocated to distinguish the independent beams in one OFDM symbol. The SRS for the terminal using the antenna having multiple panels may be configured as follows.

Figure 9:
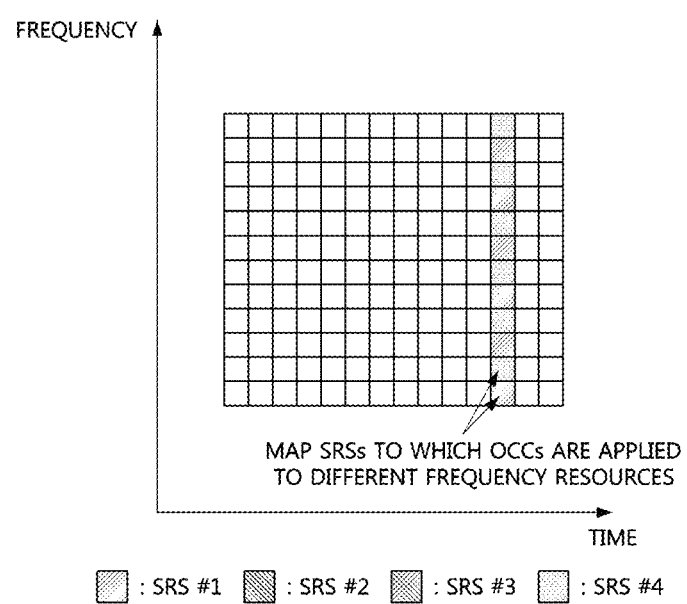
FIG. 9 is a conceptual diagram illustrating a fourth exemplary embodiment of an SRS structure in a UDN.
Figure 10:
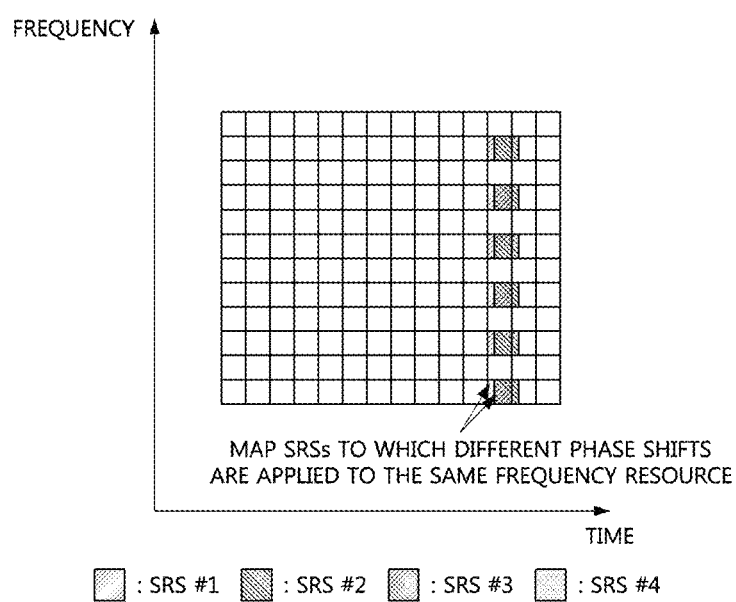
FIG. 10 is a conceptual diagram illustrating a fifth exemplary embodiment of an SRS structure in a UDN.

FIG. 9 is a conceptual diagram illustrating a fourth exemplary embodiment of an SRS structure in a UDN, and FIG. 10 is a conceptual diagram illustrating a fifth exemplary embodiment of an SRS structure in a UDN.

In the exemplary embodiment shown in FIG. 9, SRS #1 and SRS #4 may be generated based on orthogonal cover codes (OCCs), and may be mapped to different frequency resources in one OFDM symbol. In the exemplary embodiment shown in FIG. 10, SRS #1 and #2 may be mapped to the same frequency resource in one OFDM symbol, and a sequence of SRS #1 may be different from a sequence of SRS #2. For example, a phase shift applied to the sequence of SRS #1 may be different from the phase shift applied to the sequence of SRS #2.

[Clustering Procedure]

A clustering procedure (e.g., network-centric clustering procedure, user-centric clustering procedure) may be performed for cooperative transmission in the UDN. The purpose of network and user-centric clustering is to provide a consistent user QoE regardless of the location of the terminal so that the user may not feel located at a cell boundary. Considering realistic constraints (e.g., fronthaul constraints) in the UDN where many ANs exist, it may be difficult to share the CSI of the terminal in all the ANs belonging to the UDN. That is, since it is impossible for all ANs belonging to the UDN to participate in the cooperative transmission, the network and user-centric clustering procedures are required.

The uplink beam management procedure described above may be needed for the network and user-centric clustering. Considering an operation region supported by one CP in the UDN, the number of ANs belonging to the corresponding operation region may be very large. Therefore, when a CP-centric clustering is performed, the overhead of the uplink beam management procedure may be very large. To solve this problem, the network-centric clustering may be considered. In the network-centric clustering procedure, one cluster may be a configuration unit of SRS for the uplink beam management. A cluster may be considered as a cell that is temporarily configured.

Figure 11:
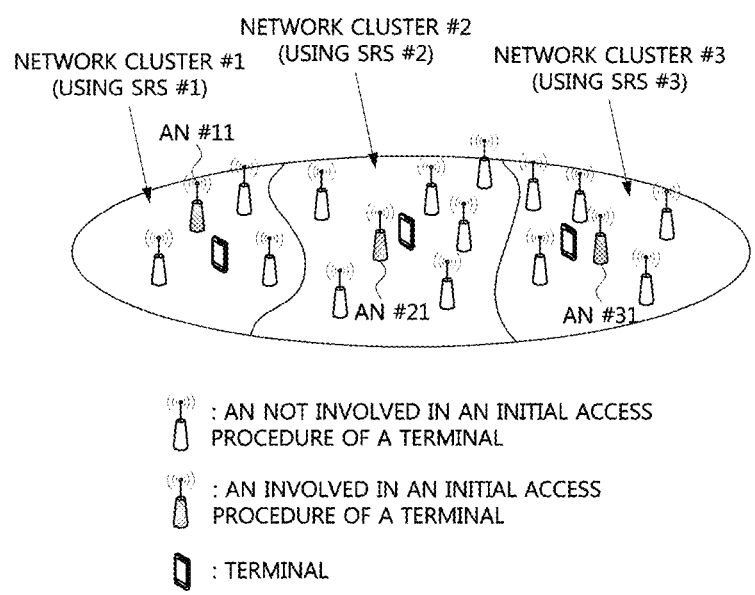
FIG. 11 is a conceptual diagram illustrating a first exemplary embodiment of a network-centric clustering procedure in a UDN.

FIG. 11 is a conceptual diagram illustrating a first exemplary embodiment of a network-centric clustering procedure in a UDN.

As shown in FIG. 11, a plurality of network clusters (e.g., network clusters #1 to #3) may be configured by network-centric clustering. A network cluster may be considered as a cell that is temporarily configured. The ANs constituting each of the network clusters #1 to #3 may be different. That is, the same AN may not belong to a plurality of network clusters.

The network cluster may be configured based on an AN to which a terminal is initially connected. For example, a network cluster #1 may be configured around an AN #11 to which a terminal is initially connected, a network cluster #2 may be configured around an AN #21 to which a terminal is initially connected, and a network cluster #3 may be configured based on an AN #31 to which a terminal is initially connected.

SRS resources for the network clusters #1 to #3 may be configured. A different SRS resource may be configured for each of the network clusters #1 to #3. For example, an SRS resource configured for the network cluster #1 may be SRS #1 shown in FIG. 6, an SRS resource configured for the network cluster #2 may be SRS #2 shown in FIG. 6, and an SRS resource configured for the network cluster #3 may be SRS #3 shown in FIG. 6. The terminal may transmit the SRS using the SRS resource configured for the corresponding network cluster.

That is, the uplink beam management procedure may be performed using the resource configured for each of the network clusters #1 to #3.

In each of the network clusters #1 to #3, the ANs may measure qualities based on the SRS received from the terminal, and may transfer quality measurement information (e.g., RSRP of the SRS) to the CP. The CP may receive the quality measurement information from the ANs, and determine ANs to perform cooperative transmission in the network cluster based on the quality measurement information. The ANs to perform cooperative transmission may be determined as follows.

Figure 12:
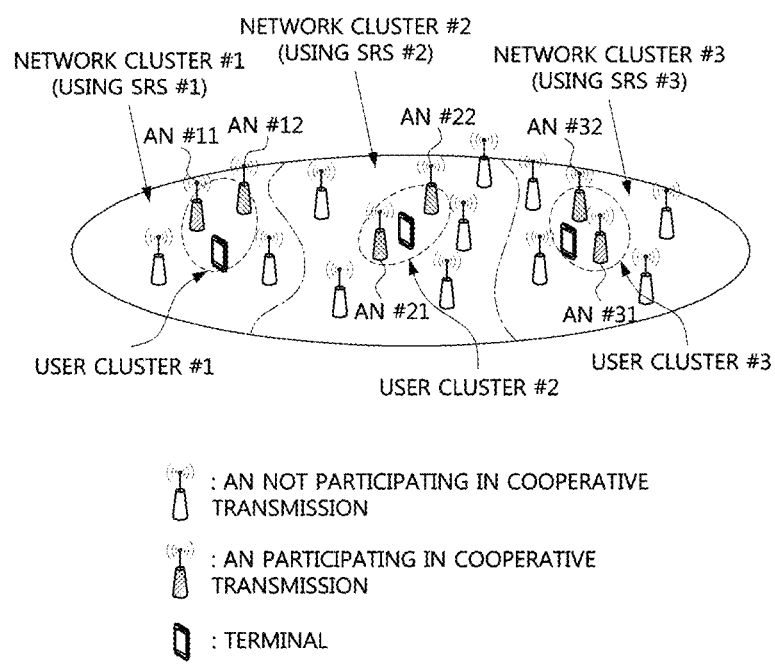
FIG. 12 is a conceptual diagram illustrating a first exemplary embodiment of a user-centric clustering procedure in a UDN.

FIG. 12 is a conceptual diagram illustrating a first exemplary embodiment of a user-centric clustering procedure in a UDN.

As shown in FIG. 12, ANs participating in cooperative transmission may be determined based on uplink quality information (e.g., beam quality information). In a network cluster #1, ANs #11 and #12 may be determined as ANs participating in the cooperative transmission, and a cluster formed by the ANs #11 and #12 may be referred to as a user cluster #1. In a network cluster #2, ANs #21 and #22 may be determined as ANs participating in the cooperative transmission, and a cluster formed by the ANs #21 and #22 may be referred to as a user cluster #2. In a network cluster #3, ANs #31 and #32 may be determined as ANs participating in the cooperative transmission, and a cluster formed by the ANs #31 and #32 may be referred to as user cluster #3.

Beam pairs (e.g., transmission beam-reception beam) between the terminal and the ANs participating in the cooperative transmission may be determined by the CP. The CP may inform the ANs participating in the cooperative transmission of the determined information. Also, information of a beam (e.g., an index of a transmission beam) used for reception of a downlink signal/channel in the cooperative transmission procedure may be signaled by the CP (e.g., AN) to the terminal. Here, the AN involved in the initial access of the terminal may transmit the beam information (e.g., the index of the transmission beam) to the terminal using the beam used in the initial access procedure. Alternatively, the AN involved in the initial access of the terminal may transmit the beam information (e.g., the index of the transmission beam) to the terminal using a separately configured beam.

When a different SRS resource is configured for each beam, the index of the SRS resource allocated to the transmission beam determined by the CP may be transmitted to the terminal through at least one of an RRC message, a MAC CE, and DCI. The terminal may determine that the transmission beam corresponding to the index of the SRS resource is the transmission beam determined by the CP.

Each of the ANs constituting the user cluster may include an antenna having a single panel or multiple panels. In addition, the terminal constituting the user cluster may include an antenna having a single panel or multiple panels. In this case, various cooperative transmission modes may be possible as follows.

Figure 13A:
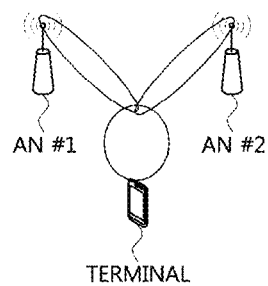
FIG. 13A is a conceptual diagram illustrating a first exemplary embodiment of a cooperative transmission mode in a UDN.
Figure 13B:
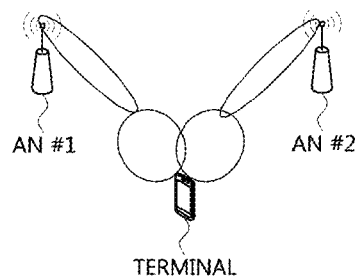
FIG. 13B is a conceptual diagram illustrating a second exemplary embodiment of a cooperative transmission mode in a UDN.
Figure 13C:
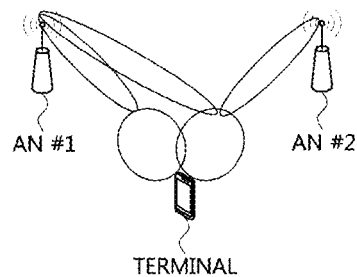
FIG. 13C is a conceptual diagram illustrating a third exemplary embodiment of a cooperative transmission mode in a UDN.

FIG. 13A is a conceptual diagram illustrating a first exemplary embodiment of a cooperative transmission mode in a UDN, FIG. 13B is a conceptual diagram illustrating a second exemplary embodiment of a cooperative transmission mode in a UDN, and FIG. 13C is a conceptual diagram illustrating a third exemplary embodiment of a cooperative transmission mode in a UDN.

In the exemplary embodiment shown in FIG. 13A, each of ANs #1 and #2 may perform communication using an antenna having a single panel, and the terminal may perform communication using an antenna having a single panel.

In the exemplary embodiment shown in FIG. 13B, each of ANs #1 and #2 may perform communication using an antenna having a single panel, and the terminal may perform communication using an antenna having multiple panels. In this case, the terminal may communicate with the AN #1 using a panel #1 and may communicate with the AN #2 using a panel #2.

In the exemplary embodiment shown in FIG. 13C, the AN #1 may perform communication using an antenna having multiple panels, the AN #2 may perform communication using an antenna having a single panel, and the terminal may perform communication using an antenna having multiple panels. In this case, the terminal may communicate with the AN #1 using a panel #1 and may communicate with the ANs #1 and #2 using a panel #2.

One of the exemplary embodiments shown in FIGS. 13A to 13C may be used in a default mode. Also, coherent or non-coherent joint transmission may be supported according to the UDN structure in the cooperative transmission modes.

Meanwhile, unlike the network cluster shown in FIG. 11, it may be allowed to include the same AN in a plurality of network clusters. That is, AN overlapping may be allowed in the network-centric clustering procedure. In this case, the network cluster may be configured as follows.

Figure 14:
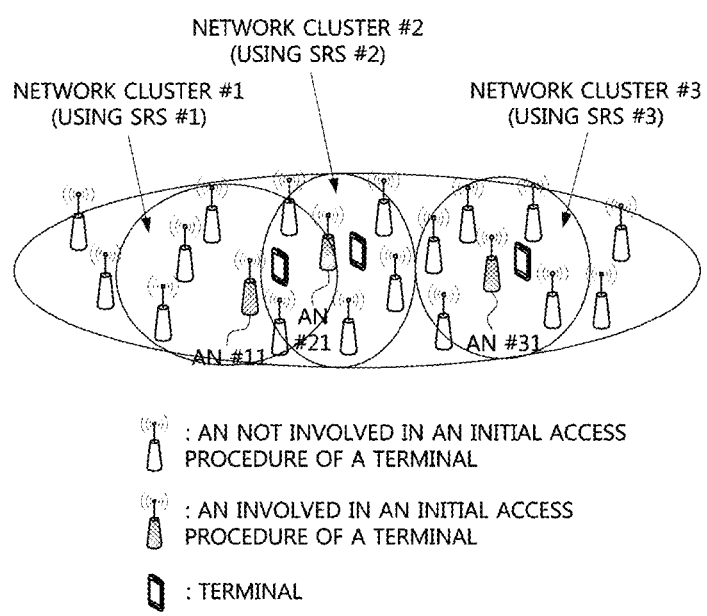
FIG. 14 is a conceptual diagram illustrating a second exemplary embodiment of a network-centric clustering procedure in a UDN.

FIG. 14 is a conceptual diagram illustrating a second exemplary embodiment of a network-centric clustering procedure in a UDN.

As shown in FIG. 14, network clusters #1 to #3 may be configured, and the network clusters #1 to #2 may include the same AN(s). According to the exemplary embodiment shown in FIG. 14, the network cluster may be configured relatively flexibly. According to the exemplary embodiment shown in FIG. 11, the network cluster may be configured in a static form. A method for determining user clusters in the exemplary embodiment shown in FIG. 14 may be different from the method for determining user clusters in the exemplary embodiment shown in FIG. 11.

For example, according to the exemplary embodiment shown in FIG. 11 (e.g., the exemplary embodiment that does not allow the AN overlapping), the ANs constituting the user clusters do not overlap each other, so that the ANs in each of the user clusters may not perform MU-MIMO transmission. On the other hand, according to the exemplary embodiment shown in FIG. 11 (e.g., the exemplary embodiment that allows the AN overlapping), the ANs constituting the user clusters may overlap each other. For example, when an AN belongs to all of the user clusters #1 and #2, the AN may simultaneously transmit signals/channels to the terminal belonging to the user cluster #1 and the terminal belonging to the user cluster #2. That is, the AN may simultaneously transmit signals/channels to the terminals belonging to the user clusters by performing MU-MIMO transmission. When the AN overlapping is allowed, the user cluster may be configured as follows.

Figure 15:
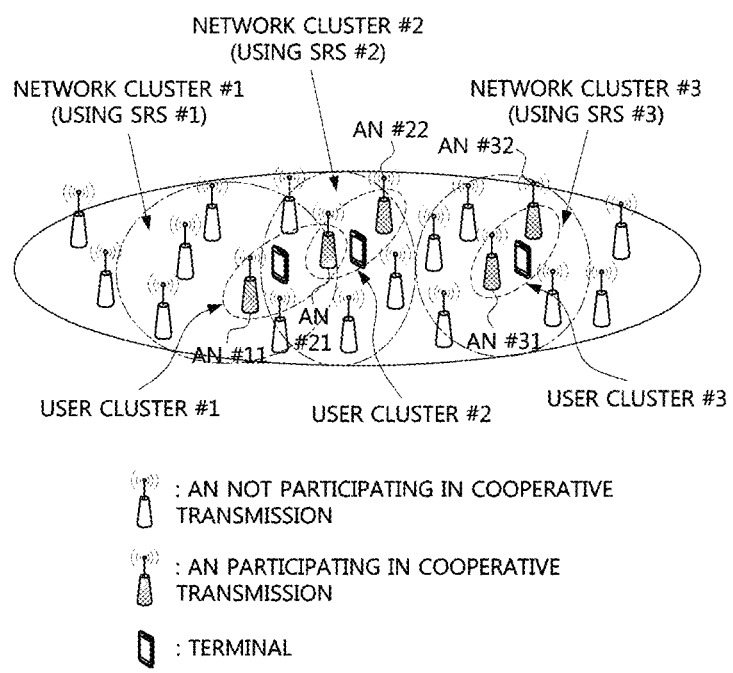
FIG. 15 is a conceptual diagram illustrating a second exemplary embodiment of a user-centric clustering procedure in a UDN.

FIG. 15 is a conceptual diagram illustrating a second exemplary embodiment of a user-centric clustering procedure in a UDN.

As shown in FIG. 15, a user cluster #1 may be configured around ANs #11 and #21, a user cluster #2 may be configured around ANs #21 and #22, and a user cluster #3 may be configured around ANs #31 and #32. The AN #21 may belong to user clusters #1 and #2 and may simultaneously transmit signals/channels to the terminal belonging to the user cluster #1 and the terminal belonging to the user cluster #2 by performing MU-MIMO transmission.

In the user clusters shown in FIG. 15, the cooperative transmission modes shown in FIGS. 13A to 13C may be possible, and the cooperative transmission modes below may be possible.

Figure 16:
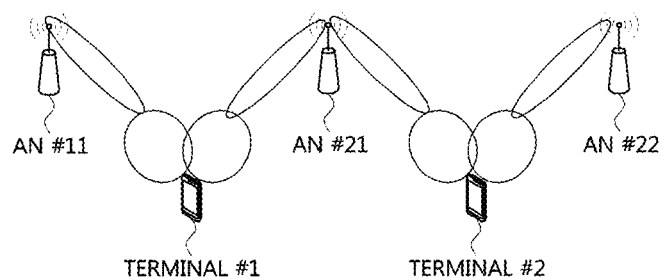
FIG. 16 is a conceptual diagram illustrating a fourth exemplary embodiment of a cooperative transmission mode in a UDN.

FIG. 16 is a conceptual diagram illustrating a fourth exemplary embodiment of a cooperative transmission mode in a UDN.

As shown in FIG. 16, ANs #11, #21, and #22 may be the ANs #11, #21, and #22 shown in FIG. 15, a terminal #1 may be the terminal belonging to the user cluster #1 shown in FIG. 15, and a terminal #2 may be the terminal belonging to the user cluster #2 shown in FIG. 15. Each of the AN #21, the terminal #1, and the terminal #2 may include an antenna having multiple panels, and the AN #21 may simultaneously transmit signals/channels to the terminals #1 and #2 by performing MU-MIMO transmission.

On the other hand, when the AN #21 includes an antenna having a single panel, the CP may request the AN #21 to select one user cluster among the user clusters #1 and #2. In this case, the AN #21 may transmit a signal/channel to the terminal belonging to the selected one user cluster. In addition, the CP may request the AN #21 including an antenna having multiple panels to select one or more user clusters among the user clusters #1 and #2. The AN #21 selecting one user cluster may transmit a signal/channel to the terminal belonging to the selected one user cluster. Alternatively, the AN #21 selecting two user clusters may simultaneously transmit signals/channels to the terminals belonging to the two user clusters by performing MU-MIMO transmission.

[Channel State Information Acquisition Procedure]

After the beam pairs (e.g., transmission beam-reception beam (i.e., reception direction)) between the ANs participating in the cooperative transmission and the terminal are determined, a cooperative transmission scheme including a digital transceiver design may be determined. In order to determine the cooperative transmission scheme, channel state information may be needed. The CSI-RS and SRS may be used for acquiring the channel state information. For example, for precoding operations in the ANs participating in the cooperative transmission, operations of acquiring uplink channel state information using the SRS may be required. For acquisition of the downlink channel state information (e.g., channel quality indicator (CQI), rank indicator (RI), and precoding matrix indicator (PMI)) and/or design of a receiving end of the terminal, a procedure for acquiring downlink channel state information using the CSI-RS may be required. The following cooperative transmission modes may be considered for the operation of acquiring channel state information.

Figure 17:
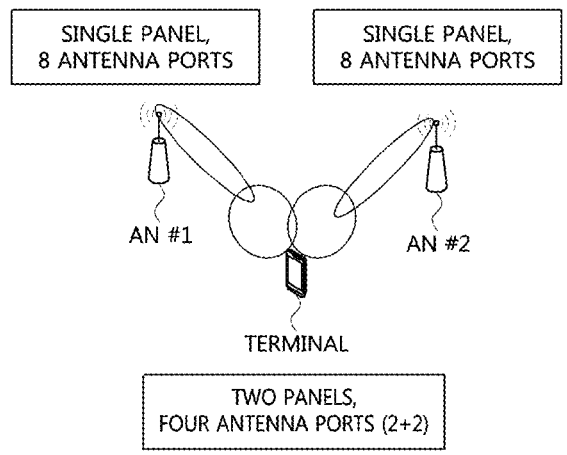
FIG. 17 is a conceptual diagram illustrating a fifth exemplary embodiment of a cooperative transmission mode in a UDN.

FIG. 17 is a conceptual diagram illustrating a fifth exemplary embodiment of a cooperative transmission mode in a UDN.

As shown in FIG. 17, an AN #1 may include an antenna having a single panel and may support eight antenna ports. An AN #2 may include an antenna having a single panel and may support eight antenna ports. The terminal may include an antenna having two panels and may support four antenna ports. In this cooperative transmission mode, the SRS used for acquiring uplink channel state information may be configured as follows.

Figure 18:
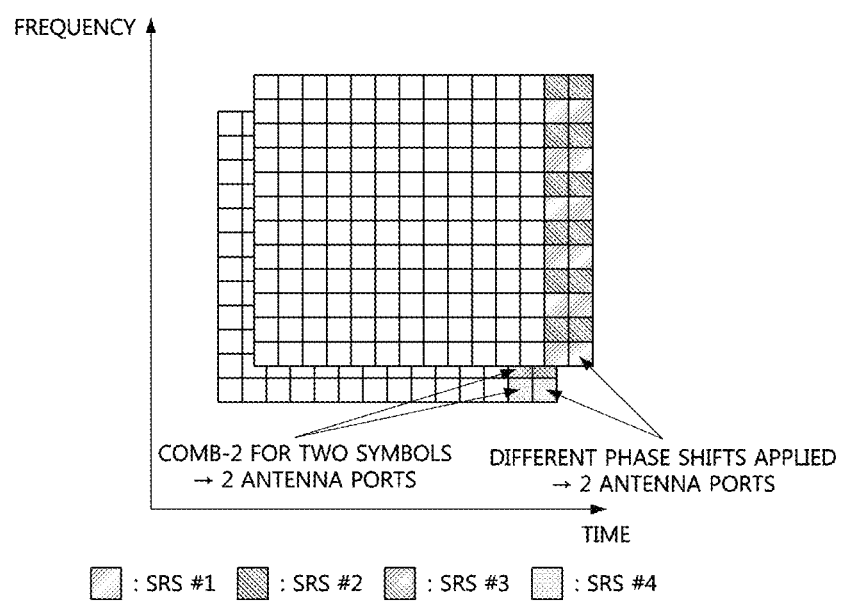
FIG. 18 is a conceptual diagram illustrating a sixth exemplary embodiment of an SRS structure in a UDN.

FIG. 18 is a conceptual diagram illustrating a sixth exemplary embodiment of an SRS structure in a UDN.

As shown in FIG. 18, the SRS may be used for acquiring uplink channel state information. A structure of the SRS used for acquiring uplink channel state information may be different from the structure of the SRS used in the beam management procedure. The SRS used for acquiring uplink channel state information may not be transmitted over a wide band and may not be configured according to a TDM scheme. Therefore, the SRS used for acquiring uplink channel state information may be freely configured in a required bandwidth (e.g., a scheduling target resource region). When the terminal supports four antenna ports, the SRS may be configured accordingly.

The structure of the CSI-RS used for acquisition of downlink channel state information in the UDN may be designed based on the general CSI-RS structure (e.g., CSI-RS structure in LTE or NR). For example, the CSI-RS may be designed based on the CSI-RS defined in the NR, and may be designed to further reflect UDN characteristics. The number of antenna ports supported for CSI-RS transmission may be greater than the number of antenna ports supported for SRS transmission. It may be a basic principle that the CSI-RS is designed to be flexible. Thus, three basic CSI-RS structures may be defined. When many antenna ports are used, three basic CSI-RS structures may be extended so that new CSI-RS structures can be designed.

Figure 19A:
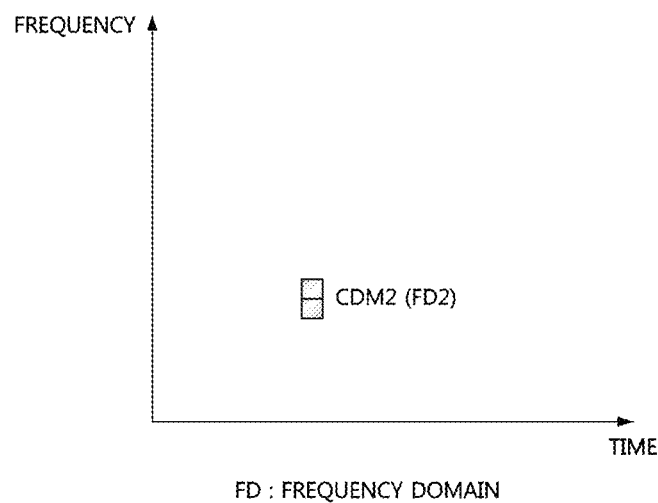
FIG. 19A is a conceptual diagram illustrating a first exemplary embodiment of a CSI-RS structure in a UDN.
Figure 19B:
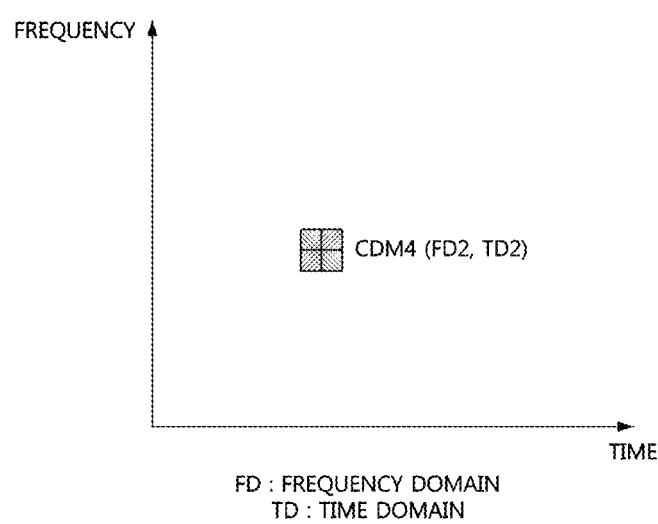
FIG. 19B is a conceptual diagram illustrating a second exemplary embodiment of a CSI-RS structure in a UDN.
Figure 19C:
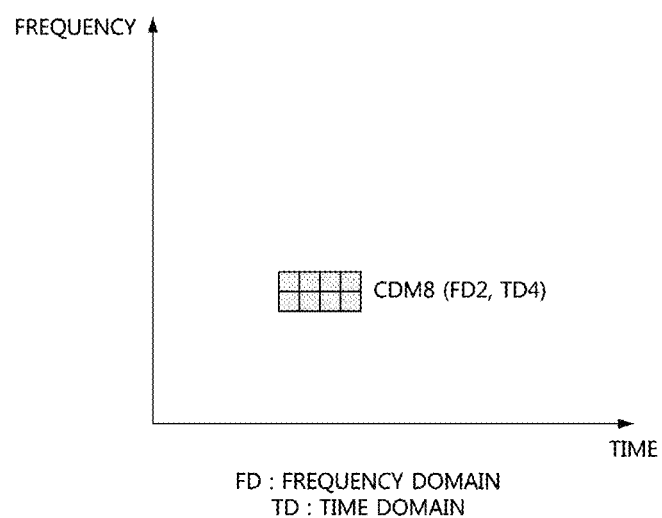
FIG. 19C is a conceptual diagram illustrating a third exemplary embodiment of a CSI-RS structure in a UDN.

FIG. 19A is a conceptual diagram illustrating a first exemplary embodiment of a CSI-RS structure in a UDN, FIG. 19B is a conceptual diagram illustrating a second exemplary embodiment of a CSI-RS structure in a UDN, and FIG. 19C is a conceptual diagram illustrating a third exemplary embodiment of a CSI-RS structure in a UDN.

Referring to FIGS. 19A to 19C, the CSI-RS structure may include a CDM2 structure, a CDM4 structure, and a CDM8 structure. When the CDM2 structure is used, the CSI-RS may be mapped to two consecutive REs in the frequency domain. When the CDM4 structure is used, the CSI-RS may be mapped to two consecutive REs in the frequency domain and may be mapped to two consecutive REs in the time domain That is, the CSI-RS may be mapped to four REs. When the CDM8 structure is used, the CSI-RS may be mapped to two consecutive REs in the frequency domain and may be mapped to four consecutive REs in the time domain. That is, the CSI-RS may be mapped to eight REs.

Referring back to FIG. 17, each of the ANs #1 and #2 may support eight antenna ports. That is, the ANs #1 and #2 participating in the cooperative transmission may support 16 antenna ports in total. When 16 antenna ports are used, the CSI-RS may be configured as follows.

Figure 20:
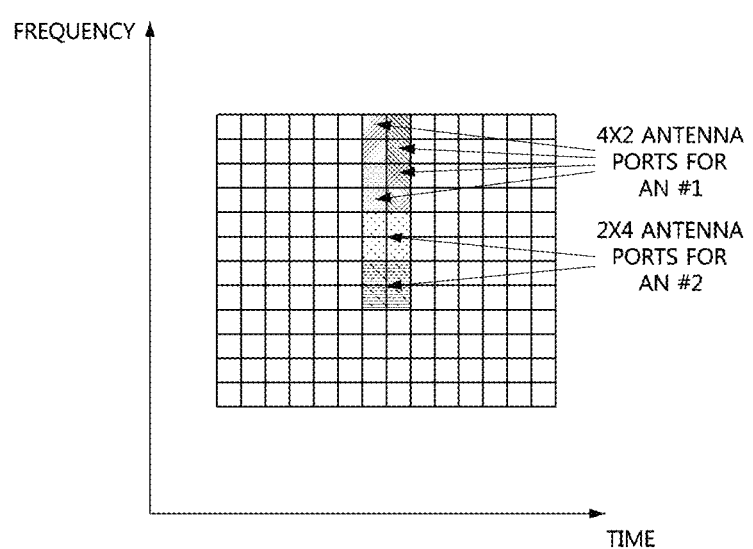
FIG. 20 is a conceptual diagram illustrating a fourth exemplary embodiment of a CSI-RS structure in a UDN.

FIG. 20 is a conceptual diagram illustrating a fourth exemplary embodiment of a CSI-RS structure in a UDN.

As shown in FIG. 20, the CSI-RS may be transmitted through REs corresponding to 8 antenna ports (e.g., 4×2 antenna ports) of the AN #1 and REs corresponding to 8 antenna ports (e.g., 2×4 antenna ports) of the AN #2. The CSI-RS may be freely mapped in a resource region to which no other downlink signal/channel is allocated.

[Cooperative Transmission Procedure]

Figure 21A:
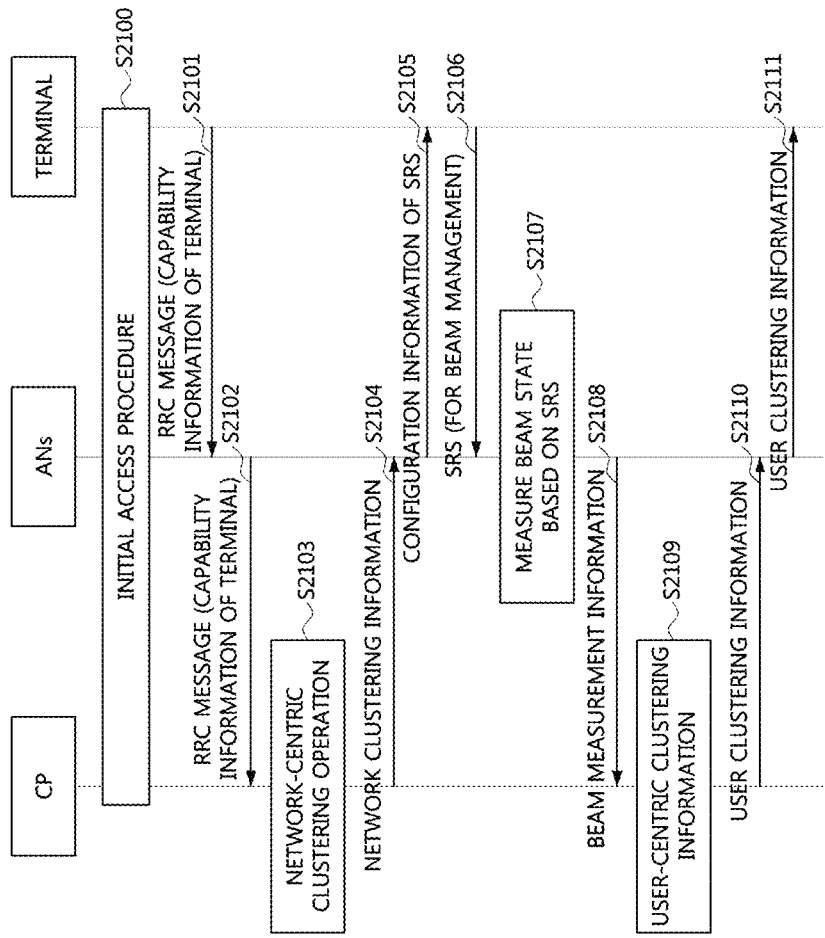
FIGS. 21A and 21B are sequence charts illustrating a first exemplary embodiment of a cooperative transmission procedure in a UDN.
Figure 21B:
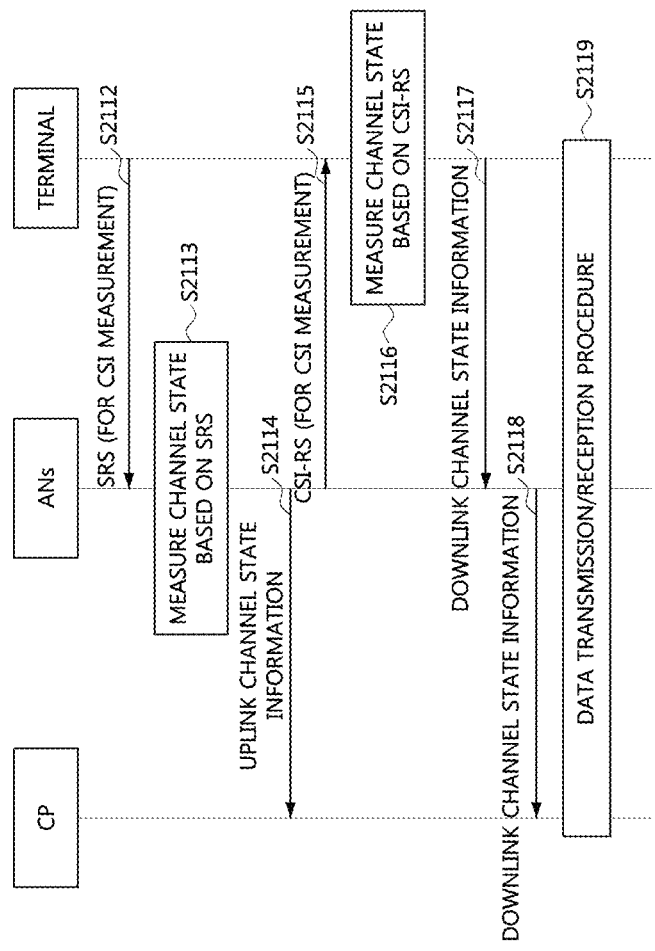

FIGS. 21A and 21B are sequence charts illustrating a first exemplary embodiment of a cooperative transmission procedure in a UDN.

Referring to FIGS. 21A and 21B, a UDN may include a CP, ANs, a terminal, and the like. The CP and the ANs may be connected through fronthaul links, and the ANs and the terminal may be connected through access links. The CP, the ANs, and the terminal shown in FIGS. 21A and 21B may be the CP, the ANs, and the terminal shown in FIG. 3. Each of the CP, the ANs, and the terminal may be configured identically or similarly to the communication node 200 shown in FIG. 2. The operations shown in FIG. 21B may be performed after the operations shown in FIG. 21A.

First, an initial access procedure for the terminal may be performed (S2100). The terminal may perform an initial access procedure with one of the ANs. When the initial access procedure is completed, the terminal may operate in an RRC connected state. The terminal may generate an RRC message including its capability information. The capability information includes information indicating the number of panels constituting the antenna of the terminal (e.g., information indicating a single panel or multiple panels), information indicating the number of beams supported by the terminal (e.g., information indicating the maximum number K of configurable analog beams (e.g., SRS resources), information indicating the number of antenna ports supported by the terminal, and the like. K may be a natural number.

The terminal may transmit the RRC message including the capability information to the AN (S2101). The corresponding RRC message may be transmitted to the AN to which the terminal is initially connected. The AN may receive the RRC message including the capability information of the terminal from the terminal, and transfer the corresponding RRC message to the CP (S2102). The CP may receive the RRC message from the AN, and may identify the capability information of the terminal included in the RRC message. The CP may perform the network-centric clustering operation based on the capability information of the terminal (S2103). In this case, one or more network clusters may be configured by the CP. The network-centric clustering operation may be performed according to the exemplary embodiment shown in FIG. 11 or the exemplary embodiment shown in FIG. 14. For example, the CP may configure a network cluster comprising M ANs based on the AN to which the terminal is initially connected. M may be a natural number.

The CP may transmit network clustering information to the ANs (S2104). The network clustering information may include an identifier of each of the network clusters, information of ANs constituting each of the network clusters, SRS information (e.g., information of an SRS resource, an SRS identifier) for each of the network clusters, and the like. Here, the SRS identifier may be configured on a network cluster basis. The ANs may receive the network clustering information from the CP, and identify the information included in the network clustering information.

The AN to which the terminal is initially connected among the ANs may transmit configuration information of SRS (or, network clustering information including the configuration information of SRS) to the terminal (S2105). The configuration information of SRS may be generated based on the network clustering information received from the CP. The configuration information of SRS may include an SRS identifier, information indicating a resource through which the SRS is transmitted, and the like. For example, the configuration information of SRS may indicate that the SRS is transmitted in resources according to one of the exemplary embodiments shown in FIGS. 6, 7, 8, 9, 10, and 18.

The configuration information of SRS may be transmitted in two steps. The AN (e.g., AN initially connected with the terminal) may transmit an RRC message (e.g., higher layer message) including configuration information of SRS resource sets to the terminal. The terminal may receive the RRC message from the AN, and may identify the configuration information of the SRS resource sets included in the received RRC message.

Each of the SRS resource sets may consist of up to K SRS resources. K may be a natural number. The configuration information of each of the SRS resource sets may include information indicating an index of the corresponding SRS resource set, information indicating the number of SRS resources constituting the corresponding SRS resource set, information indicating the number of ports (e.g., SRS ports) per SRS resource, time domain behavior information (e.g., aperiodic, periodic, semi-persistent), and the like. Each of the SRS resources constituting the SRS resource set may have an SRS sequence ID (or SRS resource index) and may be associated with each of beams. The mapping relationship information between the SRS resource and the SRS sequence ID may be transferred from the AN to the terminal through an RRC message. For example, the configuration information of the SRS resource set may further include the mapping relationship information between the SRS resource and the SRS sequence ID.

After transmitting the configuration information of the SRS resource sets, the AN may transmit to the terminal DCI (e.g., DCI format 0_1) including information (e.g., an index (es) of the SRS resource set(s)) indicating one or more SRS resource sets to be used for transmitting the SRS for beam management among the SRS resource sets configured by RRC signaling. The terminal may receive the DCI from the AN, and may determine the SRS resource set to be used for SRS transmission based on the information included in the DCI. The SRS resource set indicated by the DCI may be an SRS resource set used for beam management for each panel of the terminal.

Also, the DCI may further include information indicating a panel to which the SRS resource set indicated by the corresponding DCI is applied. For example, when the DCI includes an SRS request field composed of 4 bits, the first 2 bits of the SRS request field may indicate the SRS resource set, and the last 2 bits may indicate the panel. When the last two bits of the SRS request field are set to "00", this may indicate that the beam management operation for each panel of the terminal is not performed. Whether to perform the panel-specific beam management operation of the terminal may be determined at the network. As another example, the first two bits of the SRS request field may indicate an initial access panel, and the last two bits may indicate a panel other than the initial access panel among the panels of the terminal.

The terminal may receive the configuration information of the SRS from the AN. The terminal may transmit the SRS in a beamforming scheme using the resources indicated by the configuration information of the SRS (S2106). Here, the SRS may be transmitted using resources according to one of the exemplary embodiments shown in FIGS. 6, 7, 8, 9, 10, and 18. The ANs may receive the SRS from the terminal, and measure an uplink channel state (e.g., beam state) based on the received SRS (S2107). For example, the ANs may measure an RSRP for the SRS. The steps S2106 and S2107 may be performed based on the exemplary embodiment shown in FIG. 5, and the SRS may be used for configuring a beam pair (e.g., transmission beam-reception beam (i.e., reception direction).

The ANs may transmit beam measurement information (e.g., beam quality information) to the CP (S2108). The beam measurement information measured in the distributed ANs may be transferred to the CP, and in order to perform the user-centric clustering operation in the CP, the beam measurement information and information of the AN which performed the measurement operation of the corresponding beam may need to be effectively transferred to the CP in consideration of the limited fronthaul link capacity. Therefore, the AN may transmit an ID of the AN and the beam ID to the CP together with the beam measurement information (e.g., L1-RSRP). Here, the ID of the AN may be used to identify the AN in the UDN, and may have the same or similar concept as a cell ID. The beam ID may be an ID of an SRS sequence (or SRS resource index) mapped to the SRS resource associated with the corresponding beam.

The CP may receive the beam measurement information (or "beam measurement information+AN ID+beam ID") from the ANs, and perform the user-centric clustering operation based on the received beam measurement information (or "beam measurement information+AN ID+beam ID") (S2109). In this case, one or more user clusters may be configured by the CP. In addition, the CP may determine which beam to use with the AN(s) constituting the user cluster. The user-centric clustering operation may be performed according to the exemplary embodiment shown in FIG. 12 or the exemplary embodiment shown in FIG. 15.

The CP may transmit user clustering information to the ANs (S2110). The user clustering information may be transmitted to the ANs belonging to the user cluster (e.g., ANs participating in cooperative transmission). The user clustering information may include an identifier of each of the user clusters, information of ANs constituting each of the user clusters, information indicating a transmission beam of each of the ANs, SRS information for each of the user clusters (e.g., information of an SRS resource, SRS identifier), CSI-RS information (e.g., CSI-RS resource information) for each user cluster, and the like. Each of the SRS and the CSI-RS may be configured on a user cluster basis. The ANs may receive the user clustering information from the CP, and identify the information included in the user clustering information.

One AN among the ANs participating in the cooperative transmission (e.g., an AN initially connected with the terminal) may transmit the user clustering information (e.g., information indicating a transmission beam of the AN, SRS information, and CSI-RS information) to the terminal (S2111). The user clustering information may be transmitted through DCI. The information on the beam to be used for each panel of the terminal may be indicated by an SRS resource index (e.g., an SRS sequence ID mapped to the SRS resource) used in the beam management procedure. For example, the information on the beam to be used for each panel of the terminal may be indicated by a transmission configuration indication (TCI) field included in the DCI (e.g., DCI format 1_1). TCI configuration information (e.g., TCI table) may be transmitted from the AN to the terminal through a MAC control element (CE).

For example, when the beam management procedure is performed through two panels included in the terminal, and each of the two panels communicates with a different AN, DCI for each of the two panels may be configured. In this case, the TCI field included in the DCI of each of the panels may indicate the index of the panel or the index of the SRS resource set allocated to the panel. For example, the TCI field included in the DCI may be configured as "panel index+SRS resource index (e.g., SRS sequence ID mapped to SRS resource)" or "index of SRS resource set+SRS resource index". Alternatively, when the user clustering information is transmitted through one DCI, the corresponding DCI may include a field indicating a value in which panel-specific TCIs of the terminal are jointed. This method may be used when a plurality of ANs performs coherent joint transmission.

The terminal may receive the user clustering information from the AN, and may identify the information included in the user clustering information. The terminal may transmit the SRS in a beamforming scheme using the resources configured by the CP (S2112). The ANs participating in the cooperative transmission may receive the SRS from the terminal and measure an uplink channel state based on the SRS (S2113). The ANs may transmit uplink channel state information to the CP (S2114).

The ANs participating in the cooperative transmission may transmit the CSI-RS in a beamforming scheme using resources configured by the CP (S2115). The terminal may receive the CSI-RS from the ANs, and measure the downlink channel state based on the CSI-RS (S2116). The terminal may report downlink channel state information to the ANs participating in the cooperative transmission (S2117). The ANs may receive the downlink channel state information from the terminal and may transfer the received downlink channel state information to the CP (S2118).

A procedure for transmitting and receiving data may be performed based on the uplink/downlink channel state information (S2119). For example, in the downlink communication procedure, the CP may transmit a data unit to the ANs belonging to the user cluster. The ANs may receive the data unit from the CP and transmit the data unit to the terminal by performing the cooperative transmission. Here, the data unit may be transmitted in a beamforming scheme. In the uplink communication procedure, the terminal may transmit a data unit in a beamforming scheme. The ANs belonging to the user cluster may receive the data unit from the terminal, and forward the received data unit to the CP.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a terminal in a communication system, the operation method comprising:
   transmitting capability information of the terminal to an access node (AN);
   receiving first configuration information of a network cluster configured based on the capability information from the AN;
   transmitting a sounding reference signal (SRS) in a beamforming scheme through resources indicated by the first configuration information;
   receiving second configuration information of a user cluster configured inside the network cluster based on a measurement result of the SRS from the AN; and
   performing cooperative communication with ANs belonging to the user cluster, which are indicated by the second configuration information,
   wherein the receiving of the first configuration information comprises:
   receiving, from the AN, a radio resource control (RRC) message including configuration information of SRS resource sets including an index of an SRS resource set, information indicating a number of SRS resources constituting an SRS resource set, information indicating a number of ports per SRS resource, and time domain behavior information; and
   receiving, from the AN, downlink control information (DCI) including information indicating an SRS resource set used for transmission of the SRS among the SRS resource sets.

2. The operation method according to claim 1, wherein the capability information includes information indicating a number of panels constituting an antenna of the terminal, information indicating a number of beams supported by the terminal, and information indicating a number of antenna ports supported by the terminal.

3. The operation method according to claim 1, wherein the capability information is transmitted to the AN through the RRC message, and the AN is an AN to which the terminal is initially connected.

4. The operation method according to claim 1, wherein the SRS resource set indicated by the DCI is an SRS resource set used for beam management for each panel of the terminal.

5. The operation method according to claim 1, wherein the DCI further includes information indicating a panel of the terminal to which the SRS resource set indicated by the DCI is applied.

6. The operation method according to claim 1, wherein the second configuration information is received from the AN through the DCI, and the DCI includes a transmission configuration indication (TCI) field indicating information of a beam to be used for each panel of the terminal.

7. An operation method of an access node (AN) in a communication system, the operation method comprising:
   receiving capability information from a terminal;
   transmitting the capability information to a centralized processor (CP);
   receiving first configuration information of a network cluster configured based on the capability information from the CP;
   transmitting the first configuration information to the terminal;
   measuring a beam state based on a sounding reference signal (SRS) received from the terminal through resources indicated by the first configuration information;
   transmitting beam measurement information to the CP;
   receiving second configuration information of a user cluster configured inside the network cluster based on the beam measurement information from the CP;
   transmitting the second configuration information to the terminal; and
   providing a communication service to the terminal by performing cooperative communication with ANs belonging to the user cluster, which are indicated by the second configuration information,
   wherein the transmitting the first configuration information to the terminal comprises:
   transmitting, to the terminal, a radio resource control (RRC) message including configuration information of SRS resource sets including an index of an SRS resource set, information indicating a number of SRS resources constituting an SRS resource set, information indicating a number of ports per SRS resource, and time domain behavior information; and
   transmitting, to the terminal, downlink control information (DCI) including information indicating an SRS resource set used for transmission of the SRS among the SRS resource sets.

8. The operation method according to claim 7, wherein the capability information includes information indicating a number of panels constituting an antenna of the terminal, information indicating a number of beams supported by the terminal, and information indicating a number of antenna ports supported by the terminal.

9. The operation method according to claim 7, wherein the SRS resource set indicated by the DCI is an SRS resource set used for beam management for each panel of the terminal.

10. The operation method according to claim 7, wherein the DCI further includes information indicating a panel of the terminal to which the SRS resource set indicated by the DCI is applied.

11. The operation method according to claim 7, wherein the beam measurement information includes a reference signal received power (RSRP) for a beam, an identifier (ID) of an AN measuring the beam, and an ID of the beam.

12. A terminal in a communication system, the terminal comprising a processor and a memory storing at least one instruction executable by the processor, wherein the at least one instruction causes the processor to:
   transmit capability information of the terminal to an access node (AN);
   receive first configuration information of a network cluster configured based on the capability information from the AN;
   transmit a sounding reference signal (SRS) in a beamforming scheme through resources indicated by the first configuration information;
   receive second configuration information of a user cluster configured inside the network cluster based on a measurement result of the SRS from the AN; and
   perform cooperative communication with ANs belonging to the user cluster, which are indicated by the second configuration information,
   wherein when the first configuration information is received from the AN, the at least one instructions further causes the processor to:
   receive, from the AN, a radio resource control (RRC) message including configuration information of SRS resource sets including an index of an SRS resource set, information indicating a number of SRS resources constituting an SRS resource set, information indicating a number of ports per SRS resource, and time domain behavior information; and receive, from the AN, downlink control information (DCI) including information indicating an SRS resource set used for transmission of the SRS among the SRS resource sets.

13. The terminal according to claim 12, wherein the capability information includes information indicating a number of panels constituting an antenna of the terminal, information indicating a number of beams supported by the terminal, and information indicating a number of antenna ports supported by the terminal.

* * * * *